June 12, 1934.  C. L. UTHUS  1,962,753

RUMBLE SEAT TOP

Original Filed Sept. 12, 1931  2 Sheets-Sheet 1

Inventor
Charles L. Uthus
By Young & Young
Attorneys

June 12, 1934.  C. L. UTHUS  1,962,753
RUMBLE SEAT TOP
Original Filed Sept. 12, 1931  2 Sheets-Sheet 2
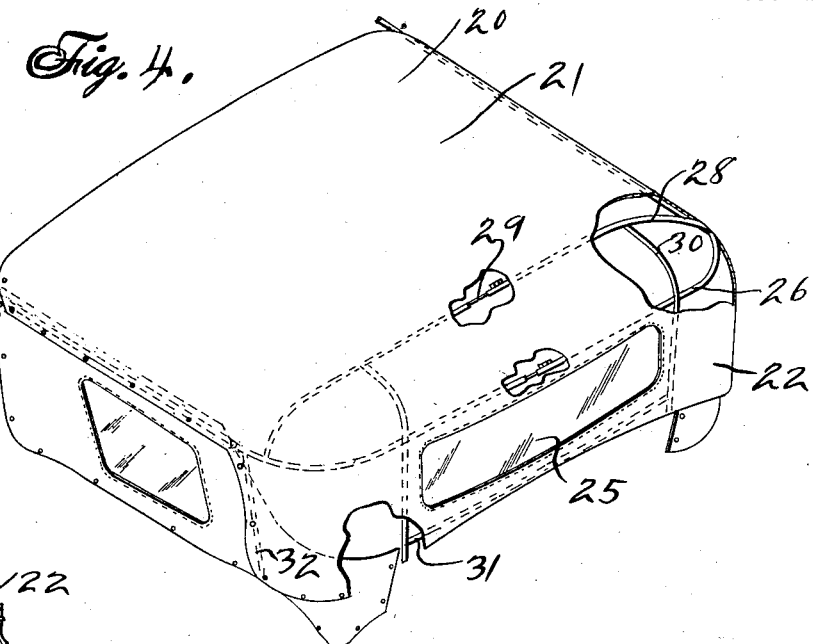
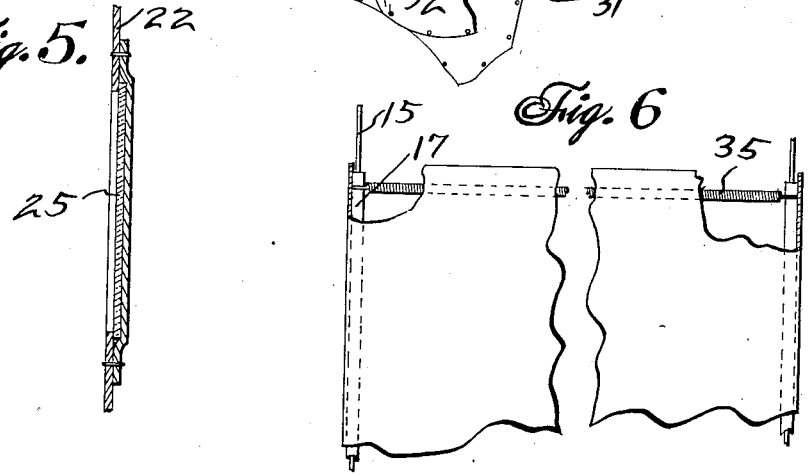
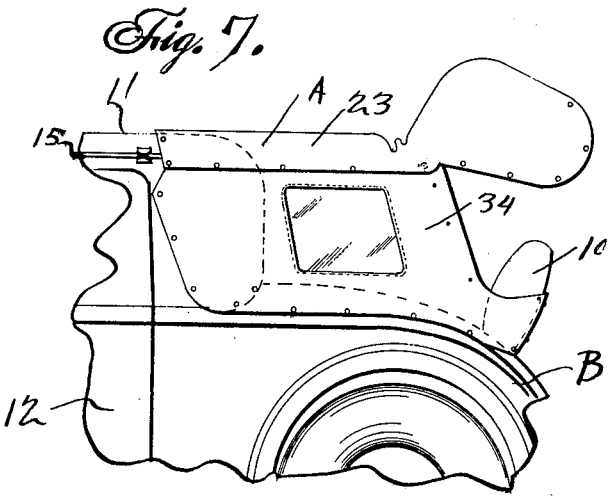
Inventor
Charles L. Uthus
By Young Young
Attorneys Patented June 12, 1934

1,962,753

UNITED STATES PATENT OFFICE 1,962,753

RUMBLE SEAT TOP

Charles L. Uthus, Milwaukee, Wis.

Application September 12, 1931, Serial No. 562,479
Renewed November 24, 1933

2 Claims. (Cl. 296—99)

This invention appertains to motor vehicles and more particularly to automobiles of the coupé or similar type embodying a rumble seat.

One of the primary objects of my invention is the provision of a novel cover or top for rumble seats, so constructed that the same can be quickly brought into use, so as to effectively protect the occupants of the rumble seat both from sun and inclement weather.

Another salient object of my invention is the provision of a novel top or cover for rumble seats of automobiles, which is so constructed that when the same is not in use, the top or cover will overlie and form a part of the conventional top of the vehicle and so associated with the vehicle, that the same can be readily and quickly moved either to its operative position over the rumble seat, or to its inoperative position over the usual top.

A further object of my invention is the provision of novel means for forming the supplemental cover or top, so that when the same is in its inoperative position over the ordinary top of the vehicle, the same will in no way detract from the appearance of the vehicle, but will give substantially the same appearance as the ordinary top.

A further object of my invention is the provision of a supplemental top or cover for rumble seats of automobiles slidably carried by the conventional top of the automobile, so as to permit the supplemental top to be readily slid over the rumble seat to form an effective cover therefor, the rear part of the supplemental cover being so arranged as to permit the same to be swung to a raised position, whereby persons can easily get into or out of the rumble seat.

A further object of my invention is the provision of side curtains which can be detachably associated with the supplemental top and automobile, when the supplemental top is moved to its operative position over the rumble seat.

A still further object of my invention is the provision of a novel top for the rumble seats of automobiles, which will be durable and efficient in use, one that will be simple and easy to manufacture and one which can be placed upon the market and associated with a motor vehicle at a low cost.

With these and other objects in view, the invention consists in the novel construction, arrangement and formation of parts, as will be hereinafter more specifically described, claimed and illustrated in the accompanying drawings:

Figure 4 is a perspective view illustrating my improved supplemental top for rumble seats, parts of the cover being shown broken away and in section;

Figure 5 is an enlarged detail vertical view through the curtain for the supplemental top;

Figure 6 is a fragmentary top plan view of the supplemental top illustrating the means utilized for holding the top in snug position on the conventional top of an automobile;

Figure 7 is a view similar to Figure 2, showing the rear end of the supplemental top in a raised position to permit access to be had to the rear seat.

Figure 1:
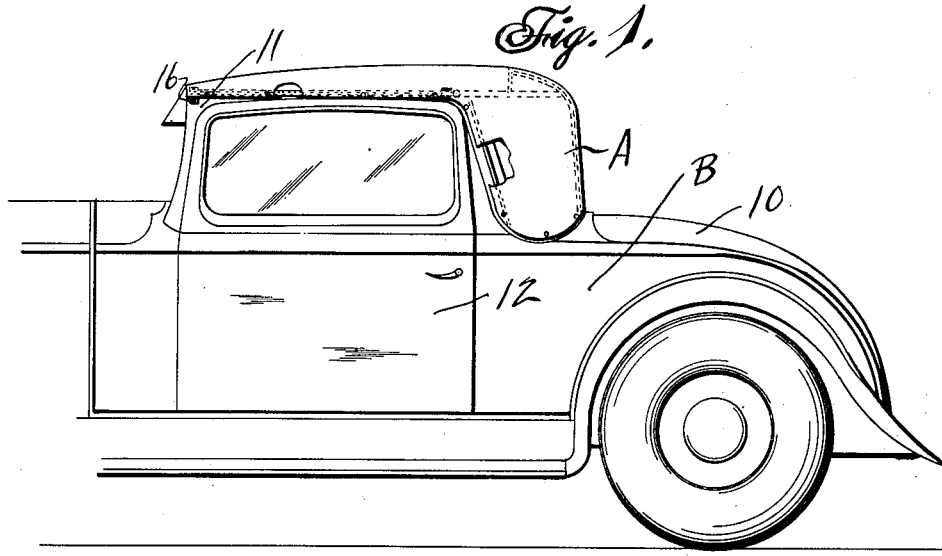
Figure 1 is a side elevation of an automobile equipped with my improved top showing the same in its inoperative position, with parts thereof broken away to illustrate structural features.

Referring to the drawings in detail, wherein similar reference characters designate corresponding parts throughout the several views, the letter "A" generally indicates my improved top for the rumble seat 10 of an automobile "B".

The automobile "B" can be considered as any desired make and style embodying a rumble seat, such as a coupé. As shown, the automobile "B" includes the usual permanent top 11.

In accordance with my invention, I secure to the sides of the top 11 directly above the doors 12 of the automobile guide rods 15. These guide rods 15 can be of a solid nature and extend from the extreme front of the top 11 to the rear thereof. The front ends of the rods 15 have formed thereon, or secured thereto, attaching brackets 16 which are fastened to the top by the use of suitable fastening elements, or the like.

Slidably mounted on the guide rods 15 are the telescoping hollow supporting rods 17. These hollow supporting rods 17 fit on the guide rods 15 more or less snugly so as to reduce play between the rods 15 and 17, and so that the rods will form an effective support for the hollow rods 17.

Adjacent to the rear end of the top 11 are secured guides 18 which are in longitudinal alignment with the brackets 16 and which slidably receive the hollow supporting rods 17. Thus, the rods are supported both at the front and rear of the top 11.

My improved device "A" comprises a supplemental top adapted to be moved from over the conventional top 11 of the vehicle and over the rumble seat 10 when the same is in use.

Figure 3:
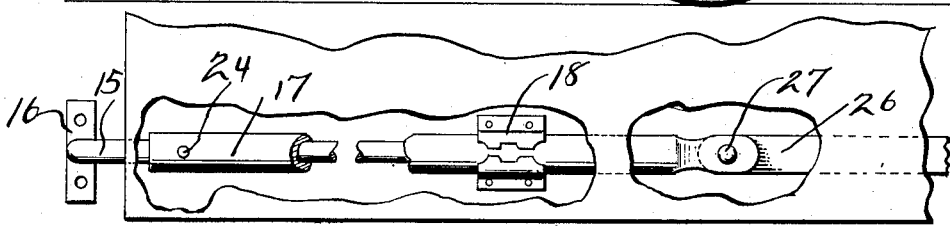
Figure 3 is an enlarged fragmentary view with parts broken away and in section illustrating the connection of the supplemental top with the guide rods carried by the permanent top on the vehicle.

Thus, the device embodies a water-proof covering 20 which is tailored to fit the conventional top 11 and snugly engage the same, in one of its positions. As shown, the cover 20 includes a top wall 21, a rear wall 22 and side walls 23. The side walls 23 depend from the top wall 21 and are in the nature of short flanges and are connected to the hollow slide rods 17 by means of snap fasteners 24. The rear wall 22 extends below the side walls and the ends thereof curve forwardly and can be integrally connected at their upper ends to the said side walls. A suitable transparent panel 25 can be carried by the rear wall 22, if so desired. The frame for supporting the cover 20 may embody, besides the hollow slide rod 17, a rear arcuate horizontally disposed bow 26. This bow can be connected by means of hinges 27 with the rear end of the slide rods 17, as clearly shown in Figure 3 of the drawings.

Figure 2:
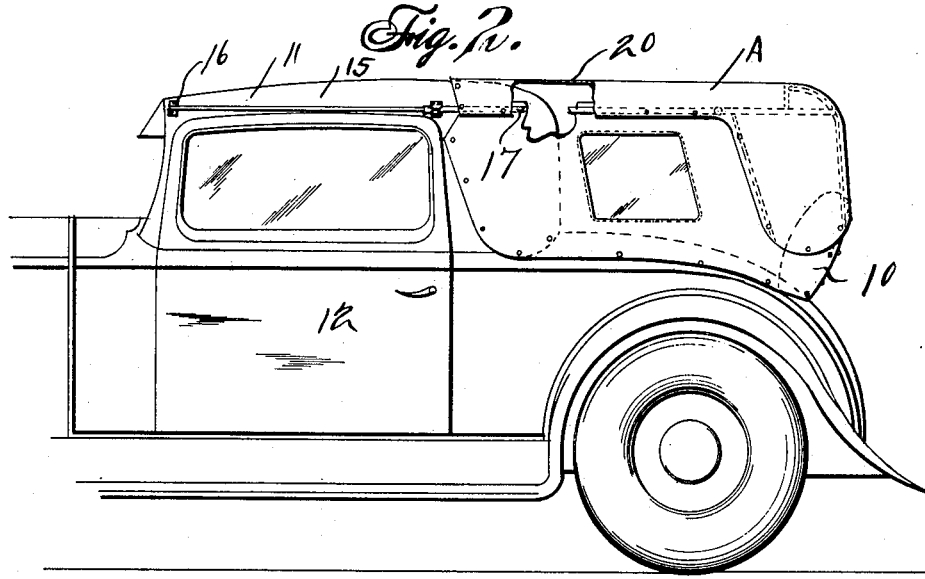
Figure 2 is a similar view showing the cover or supplemental top in its operative position over the rumble seat.

As shown, this bow engages the rear wall 22 for holding the same in shape. Extending upwardly from the horizontal bow 26 is a vertically disposed bow 28 for engaging the top wall 21 of the cover 20. If preferred, the bows 26 and 28 can be made adjustable, as indicated at 29, so as to facilitate the initial placement of the supplemental cover in position. Depending arcuate supporting rods 30 are carried by the bows 26 and 28 and also serve as means for defining the shape of the rear wall 22. A cross bar 31 can be employed for connecting the depending bars 30 together. Likewise, side vertically disposed supporting bars 32 can be carried by the horizontal bow 26. These rods 30 and 32 are adapted to rest on the back of the rumble seat when the same is in its open position, as suggested in Figure 2 of the drawings. As shown, suitable snap fasteners or other fastening devices can be employed for connecting the cover 20 at various points to the different supporting rods and bows. The covering can also be provided with the snap fasteners for engaging the rumble seat, when the rumble seat is in open position and the cover slid back over the seat.

I likewise prefer to provide removable side curtains 34 for the supplemental cover. These side curtains 34 can be made similar to ordinary curtains employed in touring cars at the present time, and the curtains can be provided with snap fasteners for engaging the body of the vehicle and the various supporting rods.

In order to hold the cover in tight relation to the top 11 of the vehicle, a contractile coil spring 35 can extend across the supplemental cover and can be connected at its terminals to slide rods 17.

From the foregoing description, it can be seen that I have provided an exceptionally simple and durable supplemental top for rumble seats of automobiles, which when in its inoperative position lies over the ordinary top 11 of the vehicle.

When it is desired to use the top, it is merely necessary to swing the rumble seat 10 to its open position and pull the supplemental cover "A" back from off of the top 11 of the vehicle over the rumble seat, and to allow the rods 30 and 32 to rest on the seat after which, the side curtains can be placed in position.

The supplemental top "A" being provided with a hinged joint 27 allows the rear end thereof to be swung to a raised position as shown in Figure 7 of the drawings, which will allow the entrance and exit of persons to and from the rumble seat, without the necessity of completely removing the top.

Changes in details may be made without departing from the spirit or the scope of my invention, but what I claim as new is:

1. The combination with an automobile having a body provided with a top and a rumble seat, of a supplemental top for the rumble seat including supporting guide rods rigidly secured at their forward ends to the front of the first mentioned top, slide rods mounted on the supporting rods, supporting guides secured to the first mentioned top adjacent to the rear end thereof slidably supporting the slide rods, a covering including a top wall, depending side walls and a rear wall, the rear wall extending below the side walls, means connecting the side walls to the slide rods, a horizontally disposed bow hingedly connected to the rear ends of the slide rods and engaging the rear wall, a vertically disposed bow carried by the horizontal bow engaging the top wall, supporting rods carried by the bows for engaging the rumble seat, a hinge joint connection between the horizontal bow and the slide rods permitting the raising of the rear end of the cover above the rumble seat, as and for the purpose specified.

2. The combination with an automobile having a body including a top and a rumble seat, of a supplemental top for the rumble seat comprising supporting guide rods secured at their forward ends to the front of the top, slide rods slidably mounted on the supporting guide rods, a covering carried by the slide rods including top, side and rear walls, a normally horizontally disposed bow extending rearwardly from the slide rods supporting the rear end of the cover, downwardly extending supporting bars connected with the bow engaging the rumble seat when the bow is in one of its positions, and means hingedly connecting the forward ends of the bow to the rear ends of the slide rods, whereby the rear end of the cover can be raised above the rumble seat.

CHARLES L. UTHUS.